United States Patent Office 2,708,152
Patented May 10, 1955

2,708,152

PRODUCTION OF DIAMMONIATE

William H. Schechter, Zelienople, and Shelby L. Walters, Evans City, Pa., assignors, by direct and mesne assignments, to Callery Chemical Company, Pittsburgh, Pa., a corporation of Pennsylvania No Drawing. Application July 11, 1950, Serial No. 173,232

4 Claims. (Cl. 23—190)

This invention relates to the production of diborane diammoniate, $B_2H_6.2NH_3$.

The classical method of making diborane diammoniate is that of Stock and Pohland, Ber., 59, 2210. Briefly, the vessel in which the compound is to be prepared is first coated with solid ammonia by admitting the gas into the evacuated vessel and gradually immersing it in liquid air. Diborane is then distilled into the vessel, and it is then placed in a bath at minus 150° C., where it gradually warms up. Subsequently, excess ammonia is evaporated to leave the desired salt in its solid, crystalline form. Obviously, that practice is ill adapted to simple, rapid and large scale production, in large part because of manipulative difficulties and slowness of procedure.

The primary object of the present invention is to provide a relatively inexpensive method of making diborane diammoniate that is simple, efficient, rapid and easily practiced with readily available equipment and starting materials, and is free from the disadvantages of earlier methods of preparation.

Other objects will be understood from the following description.

We have discovered, and it is upon this that the invention is primarily predicated, that diborane diammoniate may be produced smoothly, readily and quickly, and without the disadvantages of the method alluded to above, by reaction of boron trifluoride ($BF_3$) and sodium borohydride ($NaBH_4$) in liquid ammonia ($NH_3$). The liquid ammonia serves both to supply a reaction medium in which all of the substances involved are soluble and also to supply the ammonia necessary for the reaction.

The boron trifluoride may be supplied as such. However, in view of the difficulties of handling it, it is more desirable and convenient to use it in the form of its organic complexes, or addition compounds, and for most purposes it is preferred to use the well known and readily available boron trifluoride ethyl ether complex. Other etherates may be used as well as other organic complexes of $BF_3$, a considerable number of which are known and have equivalent action. For ease of reference both boron trifluoride and such addition compounds or complexes are referred to herein as boron trifluoride reagent.

In the preferred embodiment of the invention there is first prepared the ammonia coordination compound of boron trifluoride and ammonia: —$BF_3.NH_3$— by reaction between boron trifluoride reagent and ammonia. This may be accomplished by the procedure reported by Kraus and Brown, J. A. C. S. 51, 2690, in accordance with which gaseous ammonia is bubbled into boron trifluoride etherate ($BF_3.Et_2O$). Or, it may be prepared by a modification of that process in which the ammonia is liquefied and passed dropwise into the boron trifluoride etherate. The reaction is (I) $BF_3.Et_2O + NH_3 \rightarrow BF_3.NH_3 + Et_2O$ The resultant $BF_3.NH_3$ is recovered as a solid upon evaporation of excess $NH_3$ and the ether formed in the reaction. In accordance with the invention the $BF_3.NH_3$ is then dissolved in liquid ammonia together with sodium borohydride, which is soluble in the liquid ammonia. The two reactants are used, preferably, in the proportions of, approximately, 1 mol of $BF_3.NH_3$ per 3 mols of the borohydride. The amount of liquid ammonia is not critical provided there is enough to supply 3 mols of $NH_3$ per mol of the $BF_3.NH_3$ present and enough more to dissolve the reactants.

At the boiling temperature of ammonia the reaction proceeds smoothly and promptly as follows:

(II) $BF_3.NH_3 + 3NaBH_4 + 3NH_3 \rightarrow 2[B_2H_6.2NH_3] + 3NaF$

Sodium fluoride, one of the products of reaction is substantially insoluble in liquid ammonia and, consequently, separates from the solution. So, when equilibrium has been reached the solution of $B_2H_6.2NH_3$ is separated from the precipitated sodium fluoride, and the diammoniate is then recovered in crystalline form by evaporation of ammonia from the solution.

The apparatus needed for and the manipulative details involved in reactions of this type are familiar to those skilled in the art so that no detailed description of them is necessary. Likewise, although Reaction II has been described as being carried out at the boiling temperature of ammonia, and under the pressure prevailing at that temperature, other pressure and temperature relations may be maintained although those described specifically are convenient and afford satisfactory results.

As will be observed from the foregoing reactions, a combination of Reactions I and II would afford a one-step procedure for producing diborane diammoniate by dissolving boron trifluoride reagent and sodium borohydride in liquid ammonia in the proportions of 1 mol of the boron trifluoride reagent to 3 mols of sodium borohydride, with sufficient liquid ammonia present to provide 4 mols of ammonia for reaction and sufficiently more to dissolve the reactants. Using boron trifluoride the diammoniate would be recovered by separating the solution from sodium fluoride and evaporating ammonia, as described with relation to the two-step process detailed above. Or, using boron trifluoride in the form of a complex or an addition compound, such as the etherate, the same procedure would be followed with concurrent evaporation of the ether formed in the reaction.

Diborane diammoniate is useful for various purposes. Thus, by heating it in the vicinity of 200° C. it is converted to borazole ($B_3N_3H_6$) with liberation of hydrogen, according to the following reaction:

(III) $3[B_2H_6.2NH_3] \xrightarrow{200° C.} 2B_3N_3H_6 + 12H_2$

We have discovered further that this diammoniate affords a particularly simple, desirable and useful mode of producing diborane, by reacting it with boron fluoride reagent, suitably boron trifluoride etherate, the reaction being as follows:

(IV)

$B_2H_6.2NH_3 + 2BF_3.Et_2O \longrightarrow B_2H_6 + 2BF_3.NH_3 + 2Et_2O$

This method of producing diborane according to Reaction IV we believe to be novel and advantageous over other procedures, and it is described in greater detail and claimed in a copending application filed by us on July 11, 1950, Serial No. 173,231, and the $BF_3.NH_3$ may be recovered and returned, or cycled, for use in Reaction II.

According to the provisions of the patent statutes, we have explained the principle and mode of practicing our invention, and have described what we now consider to represent its best embodiment. However, we desire to have it understood that, within the scope of the appended claims, the invention may be practiced otherwise than as specifically described.

We claim:

1. That method of making diborane diammoniate which comprises contacting boron trifluoride reagent and ammonia and thereby producing $BF_3 \cdot NH_3$, forming a solution in liquid ammonia of said $BF_3 \cdot NH_3$ and sodium borohydride to produce diborane diammoniate, and separating the resultant solution from sodium fluoride and evaporating ammonia from it to recover solid $B_2H_6 \cdot 2NH_3$.

2. A method according to claim 1, said $BF_3$ reagent being complex of $BF_3$ and an ether.

3. A method according to claim 1, said $BF_3$ reagent being complex of $BF_3$ and ethyl ether.

4. That method of making diborane diammoniate which comprises contacting boron trifluoride reagent and ammonia and thereby producing $BF_3 \cdot NH_3$, forming a solution in liquid ammonia of said $BF_3 \cdot NH_3$ and sodium borohydride in proportions, approximately, of one mol of the former to 3 mols of the latter to produce diborane diammoniate, and separating the resultant solution from sodium fluoride and evaporating ammonia from it to recover solid $B_2H_6 \cdot 2NH_3$.

References Cited in the file of this patent

Quarterly Reviews (London), vol. 2, pages 132–151 (1948), "The Boron Hydrides and Related Compounds," by R. P. Bell.

Sodium Borohydride, Bulletin 502A, published by Metal Hydrides, Inc., 12–24 Congress Street, Beverly, Mass.

Hydrides, J. Chem. Ed., vol. 25, pages 577–582, by T. R. P. Gibb.

Pilot Plant Preparation of Diborane, January 17, 1949, published by Naval Research Laboratory, NRL Report c–3405, pages 1 and 6.